United States Patent [19]
Anderson

[11] Patent Number: 4,762,493
[45] Date of Patent: Aug. 9, 1988

[54] SCENTED TEACHING AID, PARTICULARLY CRAYONS

[76] Inventor: Raymond G. Anderson, 206 N. Sharmin St., Ankeny, Iowa 50021

[21] Appl. No.: 641,261

[22] Filed: Aug. 16, 1984

[51] Int. Cl.$^4$ .............................................. G09B 19/00
[52] U.S. Cl. .............................. 434/84; 273/DIG. 27; 401/49
[58] Field of Search ............... 252/522 A; 273/157 R, 273/DIG. 27; 401/6, 49; 434/84, 112, 170, 346, 377; D19/41, 45; D28/85

[56] References Cited

U.S. PATENT DOCUMENTS

| | | | |
|---|---|---|---|
| 2,162,584 | 6/1939 | Kole | 401/49 |
| 3,570,139 | 3/1971 | Ladd | 434/346 |
| 4,011,311 | 3/1977 | Noomen | 252/522 A X |
| 4,051,159 | 9/1977 | Tsoucalas | 252/522 A X |

FOREIGN PATENT DOCUMENTS

| | | | |
|---|---|---|---|
| 163659 | 12/1981 | Japan | 252/522 A |
| 1223220 | 2/1971 | United Kingdom | 252/522 A |

OTHER PUBLICATIONS

E. Faber Co. 1901 catalog, "Triangle" Pencils, p. 12 only.
Milton Bradley 1965-66 catalog, pp. 2, 3, 9 only.

Primary Examiner—William H. Grieb
Attorney, Agent, or Firm—Zarley, McKee, Thomte, Voorhees & Sease

[57] ABSTRACT

A scented teaching aid to assist in teaching identification of color to scent, and scent to color, wherein crayons made of colored wax, colored chalk, or colored clay are impregnated with a scent corresponding rationally with the color of the crayon. Likewise, molding clay made out of colored clay is impregnated with a scent rationally related to its color. The user of the teaching aid can then be taught to associate scent to color and color to scent. The crayons can be made to be triangular in cross-section to prohibit rolling and to provide far more efficient packaging.

7 Claims, 1 Drawing Sheet

SCENTED TEACHING AID, PARTICULARLY CRAYONS

BACKGROUND OF THE INVENTION

1. Field of the Invention

This invention relates to a teaching aid to assist in teaching identification of color to scent, and scent to color, more particularly, scented crayons and clay having an impregnated scent, logically bearing a relationship to the color of the crayon or clay.

2. Problems in the Art

A much overlooked device for teaching involves the olfactory senses. To combine scents with logically related colors would be an advantageous teaching tool.

There are presently some few scented writing instruments and erasers. Most are in the form of "magic markers", pens or pencils. The primary disadvantages of "magic markers" are, first, that they often stain and are hard to remove from clothing, furniture, walls, and other objects. Secondly, some markers bleed through paper and cannot be blended with other colors. Third, markers are expensive and a cap must be kept on them or they will dry out. Some markers also are toxic. In short, they are not satisfactory for the purpose of this invention.

Likewise, with pencils and pens, expense is a factor. They cannot be blended in color, and pencils do not leave a mark which is also scented. Neither will therefore fulfill the need of this invention.

Crayons are usually a preferable writing or drawing instrument for smaller children. They are easier for the child to draw with because of their size, they are much neater than markers, pens, or pencils, the colors can be blended on paper, they are non-toxic, they will not stain clothing and they are generally safe for use by small children. Crayons are also much less expensive than the other items above mentioned.

Molding clay also has the ability to be used by small children, without being messy, toxic or expensive.

Conventional crayons, round in cross-section, additionally present the problem of rolling. Conventional crayons can roll off a desk top, roll under furniture, and present a hazard to those happening to step on them.

Therefore, for these reasons, it is a primary object of this invention to solve and improve upon the problems in the art, of teaching children color-scent relationships.

A further object of this invention is to provide safe, scented teaching crayons which assist in teaching identification of color to scent, and scent to color.

Another object of this invention is to provide a scented teaching aid which is non-toxic.

A further object of this invention is to provide a scented teaching aid which will not stain clothing or fabrics, or create an uncleanable or hard to clean mess.

Another object of this invention is to provide a scented teaching aid which is inexpensive and easy to use.

Another object of this invention is to provide safe, scented crayons of a preferred shape for easy packaging, and comfortable hand feel.

A further object is to provide safe crayons which will not roll.

These and additional objects, features and advantages of the invention can be seen with reference to the accompanying specification.

SUMMARY OF THE INVENTION

This invention utilizes non-toxic artificial scents which are impregnated into the matrix of the teaching aid such as crayons and molding clay in order to assist in the teaching identification of color to scent and scent to color. The non-toxic artificial scents are impregnated into colored molding clay and colored wax, chalk or clay crayons. The scents are logically matched to the color of the crayons so that a recognizable identification exists between scent and color.

For example, orange crayons can be impregnated with the scent of orange fruit or pumpkin. Black crayons or clay can be impregnated with a licorice scent. Green crayons can be impregnated with lime, pine or wintergreen scent. Brown crayons can be chocolate scented, and so on.

The nature of the crayons and clay is that any marks or remnants contain the scent so that the mark of the scented crayons on paper also retains its selected scent, further reinforcing the color-scent relationship.

Additionally, the crayon embodiment of the invention can take on a non-roll, symmetrical shape, such as being triangular in cross-section.

DETAILED DESCRIPTION OF THE PREFERRED EMBODIMENT

Figure 1:
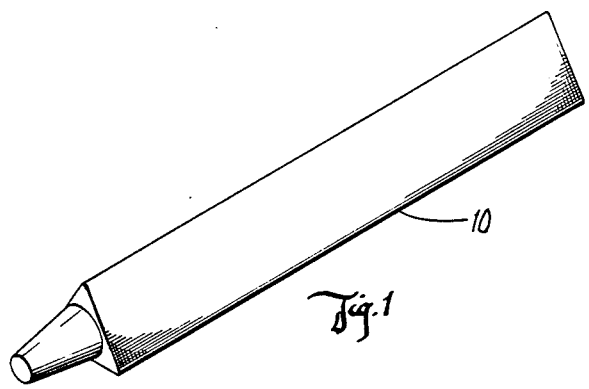
FIG. 1 is a perspective view of a preferred triangle cross-section crayon.

In reference to the drawings, and particularly FIG. 1, there is shown a crayon 10 in accordance with the invention. Crayon 10 may be standard in shape (round) or the preferred triangle shape as shown. Pencils may also be made in the preferred triangle cross section.

Crayon 10 can either be made of colored wax, colored chalk, or colored clay according to known methods in the art. It can be made to be virtually any color on the color spectrum by combining primary colors in varying proportions as is known in the art.

Figure 2:
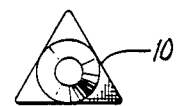
FIG. 2 is a sectional view taken along line 2—2 of FIG. 1.

According to the invention, an artificial scent is impregnated within crayon 10. By referring to FIG. 2, it is illustrated that when manufacturing crayon 10, the scent is disbursed throughout crayon 10 and is meant to be uniform throughout each cross-sectional area of crayon 10.

Figure 3:
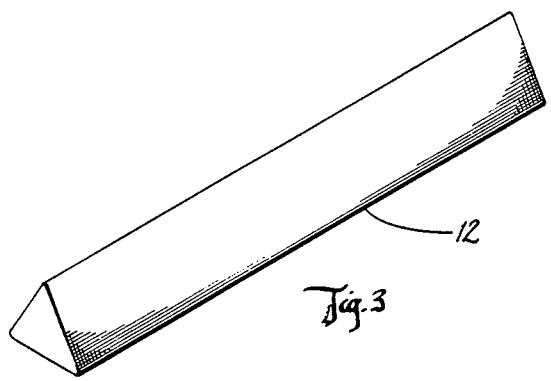
FIG. 3 is a perspective view of a scented chalk in the preferred triangle shape.
Figure 4:
FIG. 4 is a sectional view of a scented chalk.

FIGS. 3 and 4 depict a chalk crayon 12, which can be round or, as shown, can be triangular.

The artificial scents can be any of those standard edible, non-toxic liquid scents known in the art, such as those made and commercially available by Lorann Oils, Inc., of 4518 Aurelius Road, Lansing, Mich. 48910. The scents used must be non-toxic and are impregnated into the crayon by simply mixing the scented liquid into the liquid material which is finally molded into the crayon.

Figure 5:
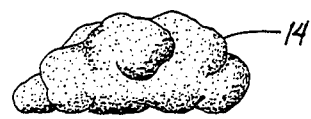
FIG. 5 is a front view of molding clay.

Similarly, with the molding clay 14 of FIG. 5, the scent is mixed into the clay so that it is uniformly distributed therethrough.

A typical amount of scent to be added to one crayon will depend upon the smell intensity of the scent concentrate. The amount required is a sufficient amount to impart the desired scent to the entire crayon such that it will be retained, and also imparted to the markings on the paper to be marked. For the referred to Lorann oils, approximately 2.5% by weight of Lorann Oils, Inc. artificial flavoring to each crayon. The amount of scent to either crayon or clay material would be from about 0.05% by weight to about 8% by weight, preferably from about 0.5% by weight to about 5.0% by weight.

It is to be noted that the advantages of the invention apply not only to small children, but also to the mentally impaired or handicapped, and also to persons that are colorblind. By identifying the smell or scent, the colorblind person could choose a correct color.

Figure 6:
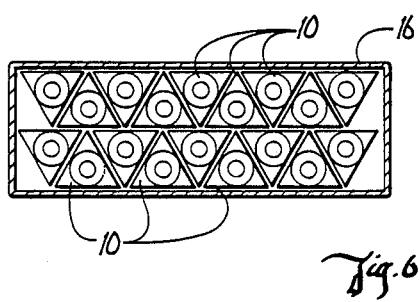
FIG. 6 is a crayon box, packed with triangle shape crayons showing their ability for efficient packing.

FIG. 6 illustrates the preferred packing method for the triangle shaped crayons. It shows that much smaller packages 16 per number of crayons can be used, or alternatively many more crayons can be packed per package 16. These also have the advantage of being far more comfortable to the hand than the traditional round crayon, with each flat side corresponding to a flat finger area in the traditional finger grasp for a pen, pencil or crayon. They also assist in teaching fine motor skills. A primary advantage is the resistance of the trianglular shape to rolling, a real problem with conventional round crayons.

Figure 7:
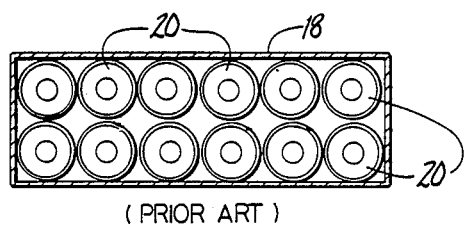
FIG. 7 is a depiction of conventional round crayons in the prior art and how they must be packed.

By way of comparison, FIG. 7 illustrates a conventional packing box 18 with conventional round-in-cross-section crayons 20. It can be seen that significantly fewer round crayons can be packed into the identical sized packing box 18 as that of triangular crayons in packing box 16.

The included preferred embodiment is given by way of example only, and not by way of limitation to the invention, which is solely described by the claims herein. Variations obvious to one skilled in the art will be included within the invention defined by the claims.

What is claimed is:

1. A scented colored crayon for use as a teaching aid to assist in teaching identification of color to scent, and scent to color, comprising:
    a crayon having from about 0.05% by weight to about 8% by weight of an artificial scent impregnated therein;
    said crayon being of a color logically related to the impregnated scent.

2. The device of claim 1 wherein said impregnated artificial scent is from about 0.5% by weight to about 5.0% by weight.

3. The device of claim 1 wherein said crayon is made of colored wax.

4. The device of claim 1 wherein said artificial scent is non-toxic.

5. The device of claim 1 wherein said crayon is triangular in cross-section so as to prevent rolling of said crayon.

6. A scented color crayon teaching aid to assist in teaching color to scent and scent to color comprising:
    a colored crayon having an artificial scent of from about 0.05% by weight to about 8% by weight impregnated therein, said crayon being of a color logically related to the impregnated scent;
    said crayons being triangular in cross-section so that said crayons resist rolling and can be packed efficiently.

7. A method of teaching especially small children or the color blind, the logical relationships between color and scent, comprising:
    providing a colored crayon bearing an impregnated scent and being of a color logically related to said scent, and
    teaching the smell scent relationship with the crayon teaching aid.

* * * * *